(12) United States Patent
Segaert et al.

(10) Patent No.: US 10,774,543 B2
(45) Date of Patent: Sep. 15, 2020

(54) PANEL FOR FORMING A FLOOR COVERING

(71) Applicant: UNILIN, BVBA, Wielsbeke (BE)

(72) Inventors: Martin Segaert, Ypres (BE); Christophe Naeyaert, Jabbeke (BE)

(73) Assignee: UNILIN, BVBA, Wielsbeke (BE)

( * ) Notice: Subject to any disclaimer, the term of this patent is extended or adjusted under 35 U.S.C. 154(b) by 0 days.

(21) Appl. No.: 16/364,378

(22) Filed: Mar. 26, 2019

(65) Prior Publication Data

US 2019/0218794 A1 Jul. 18, 2019

Related U.S. Application Data

(63) Continuation of application No. 15/924,869, filed on Mar. 19, 2018, now Pat. No. 10,480,201, which is a (Continued)

(30) Foreign Application Priority Data

Jun. 1, 2012 (BE) .................................. 2012/0370
Jul. 6, 2012 (BE) .................................. 2012/0474

(51) Int. Cl.
*E04F 15/10* (2006.01)
*B29C 70/08* (2006.01)
(Continued)

(52) U.S. Cl.
CPC .............. *E04F 15/107* (2013.01); *B27N 3/06* (2013.01); *B29C 43/006* (2013.01); *B29C 43/30* (2013.01);
(Continued)

(58) Field of Classification Search
CPC ... E04F 15/107; E04F 15/02038; E04F 15/08; E04F 15/102; E04F 15/105;
(Continued)

(56) References Cited

U.S. PATENT DOCUMENTS 3,361,609 A 1/1968 Borack
3,623,937 A 11/1971 Gasaway
(Continued)

FOREIGN PATENT DOCUMENTS

CN 201521091 7/2010
EP 0899372 A2 3/1999
(Continued)

OTHER PUBLICATIONS

International Search Report (ISR) dated Nov. 7, 2013, for PCT/IB2013/054481.
(Continued)

*Primary Examiner* — Brent W Herring
(74) *Attorney, Agent, or Firm* — Bacon & Thomas, PLLC (57) ABSTRACT

A panel including at least a substrate of thermoplastic material and a top layer with a printed decor and a translucent or transparent wear layer. The substrate includes three layers, including a lowermost layer, a central layer and an uppermost layer, all made from thermoplastic material, where the thermoplastic material of the central layer is more rigid than the thermoplastic material of the lower most layer and the uppermost layer.

16 Claims, 1 Drawing Sheet

Related U.S. Application Data continuation of application No. 15/377,198, filed on Dec. 13, 2016, now Pat. No. 10,066,401, which is a continuation of application No. 14/402,022, filed as application No. PCT/IB2013/054481 on May 30, 2013, now Pat. No. 9,624,678.

(51) Int. Cl.

| | | |
|---|---|---|
| *B29C 43/30* | (2006.01) | |
| *B29C 43/48* | (2006.01) | |
| *B27N 3/06* | (2006.01) | |
| *B32B 27/12* | (2006.01) | |
| *B32B 27/30* | (2006.01) | |
| *B32B 37/10* | (2006.01) | |
| *B32B 37/24* | (2006.01) | |
| *B32B 38/00* | (2006.01) | |
| *B29C 70/50* | (2006.01) | |
| *B29C 43/00* | (2006.01) | |
| *E04F 15/08* | (2006.01) | |
| *B32B 5/02* | (2006.01) | |
| *D06N 3/00* | (2006.01) | |
| *E04F 15/02* | (2006.01) | |
| *B29L 31/00* | (2006.01) | |
| *B32B 37/00* | (2006.01) | |
| *B29K 101/12* | (2006.01) | |
| *B29K 309/08* | (2006.01) | |

(52) U.S. Cl.
CPC ............ *B29C 43/305* (2013.01); *B29C 43/48* (2013.01); *B29C 70/081* (2013.01); *B29C 70/506* (2013.01); *B32B 5/024* (2013.01); *B32B 27/12* (2013.01); *B32B 27/304* (2013.01); *B32B 37/1027* (2013.01); *B32B 37/24* (2013.01); *B32B 38/145* (2013.01); *D06N 3/0022* (2013.01); *E04F 15/02038* (2013.01); *E04F 15/08* (2013.01); *E04F 15/102* (2013.01); *E04F 15/105* (2013.01); *B29C 2043/483* (2013.01); *B29K 2101/12* (2013.01); *B29K 2309/08* (2013.01); *B29L 2031/732* (2013.01); *B32B 37/0015* (2013.01); *B32B 2305/08* (2013.01); *B32B 2305/10* (2013.01); *B32B 2305/22* (2013.01); *B32B 2305/30* (2013.01); *B32B 2307/412* (2013.01); *B32B 2307/414* (2013.01); *B32B 2307/7242* (2013.01); *B32B 2307/734* (2013.01); *B32B 2309/105* (2013.01); *B32B 2315/08* (2013.01); *B32B 2315/085* (2013.01); *B32B 2327/06* (2013.01); *B32B 2398/20* (2013.01); *B32B 2419/00* (2013.01); *B32B 2471/00* (2013.01); *E04F 2201/0153* (2013.01); *E04F 2201/0161* (2013.01); *E04F 2201/023* (2013.01); *Y10T 428/24868* (2015.01)

(58) Field of Classification Search
CPC ........ E04F 2201/023; E04F 2201/0161; E04F 2201/0153; B32B 5/024; B32B 37/1027; B32B 37/24; B32B 38/145; B32B 27/12; B32B 27/304; B32B 2305/10; B32B 2315/08; B32B 2398/20; B32B 2419/00; B32B 37/0015; B32B 2305/08; B32B 2305/22; B32B 2305/30; B32B 2307/412; B32B 2307/414; B32B 2307/7242; B32B 2307/734; B32B 2309/105; B32B 2315/085; B32B 2327/06; B32B 2471/00; D06N 3/0022; B29C 43/006; B29C 43/30; B29C 43/48; B29C 70/506; B29C 70/081; B29C 43/305; B29C 2043/483; B27N 3/06; Y10T 428/24868; B29K 2101/12; B29K 2309/08; B29L 2031/732
See application file for complete search history.

(56) References Cited

U.S. PATENT DOCUMENTS

| | | | |
|---|---|---|---|
| 3,988,098 A | 10/1976 | Kato | |
| 6,306,318 B1 | 10/2001 | Ricciardelli et al. | |
| 7,169,719 B2 | 1/2007 | Mehta | |
| 8,419,877 B2 | 4/2013 | Pervan | |
| 8,431,054 B2 | 4/2013 | Pervan et al. | |
| 8,549,807 B2 | 10/2013 | Meersseman et al. | |
| 8,689,513 B2 | 4/2014 | Windmoller | |
| 8,728,260 B2 | 5/2014 | Dodge | |
| 9,366,035 B2* | 6/2016 | Meersseman | B27N 7/00 |
| 9,453,348 B1* | 9/2016 | Meersseman | B27N 7/00 |
| 9,522,489 B2 | 12/2016 | Anderson et al. | |
| 9,624,678 B2 | 4/2017 | Segaert | |
| 9,758,973 B2 | 9/2017 | Segaert | |
| 10,066,401 B2* | 9/2018 | Segaert | B29C 70/081 |
| 2005/0042438 A1 | 2/2005 | Afif | |
| 2005/0282449 A1 | 12/2005 | Mehta | |
| 2006/0014453 A1 | 1/2006 | Maia | |
| 2006/0270298 A1 | 11/2006 | Kuhn | |
| 2007/0091074 A1 | 4/2007 | Nashiki et al. | |
| 2008/0138560 A1 | 6/2008 | Windmoller | |
| 2009/0235599 A1 | 9/2009 | Ware | |
| 2009/0239429 A1 | 9/2009 | Kipp | |
| 2010/0003502 A1 | 1/2010 | Nashiki et al. | |
| 2010/0055420 A1 | 3/2010 | Vermeulen | |
| 2010/0092731 A1 | 4/2010 | Pervan et al. | |
| 2011/0177739 A1 | 7/2011 | Kiljunen | |
| 2011/0189410 A1 | 8/2011 | Dodge | |
| 2011/0268937 A1 | 11/2011 | Schacht | |
| 2011/0296780 A1 | 12/2011 | Windmoller | |
| 2011/0300392 A1 | 12/2011 | Vermeulen | |
| 2012/0009377 A1 | 1/2012 | Dodge | |
| 2012/0276348 A1 | 11/2012 | Clausi et al. | |
| 2013/0067842 A1 | 3/2013 | Meersseman et al. | |
| 2013/0104486 A1 | 5/2013 | Windmoller | |
| 2013/0164470 A1 | 6/2013 | Oppermann et al. | |
| 2013/0164507 A1 | 6/2013 | Shen | |
| 2013/0183506 A1 | 7/2013 | Vermeulen | |
| 2013/0209810 A1 | 8/2013 | Dodge | |
| 2013/0280976 A1 | 10/2013 | McCann et al. | |
| 2014/0147641 A1 | 5/2014 | Vermeulen | |
| 2014/0242342 A1 | 8/2014 | Vandevoorde et al. | |
| 2014/0251538 A1 | 9/2014 | Dodge | |
| 2015/0107178 A1 | 4/2015 | Meersseman et al. | |
| 2015/0121793 A1 | 5/2015 | Segaert | |
| 2015/0167319 A1 | 6/2015 | Segaert et al. | |
| 2016/0144606 A1 | 5/2016 | Van Vlassenrode | |
| 2016/0361901 A1 | 12/2016 | Dodge | |
| 2017/0087781 A1 | 3/2017 | Segaert | |
| 2017/0335573 A1 | 11/2017 | Segaert | |
| 2018/0209155 A1 | 7/2018 | Segaert | |

FOREIGN PATENT DOCUMENTS

| | | | |
|---|---|---|---|
| EP | 1026341 | A2 | 8/2000 |
| EP | 1593490 | A1 | 11/2005 |
| EP | 1938963 | A1 | 7/2008 |
| EP | 2153967 | A1 | 2/2010 |
| EP | 2339092 | A1 | 6/2011 |
| EP | 2402153 | A1 | 1/2012 |
| EP | 2754688 | A1 | 7/2014 |
| GB | 1248060 | A | 9/1971 |
| WO | 9747834 | A1 | 12/1997 |
| WO | 2008/122668 | A1 | 10/2008 |
| WO | 2009065769 | A2 | 5/2009 |
| WO | 2010023042 | A1 | 3/2010 |
| WO | 2010/081860 | A1 | 7/2010 |
| WO | 2012/001091 | A1 | 1/2012 |
| WO | 2012/001109 | A1 | 1/2012 |
| WO | 2012004701 | A2 | 1/2012 |
| WO | 2012016916 | A1 | 2/2012 |

(56) References Cited

FOREIGN PATENT DOCUMENTS

| WO | 2013/179260 A1 | 12/2013 |
| WO | 2013185391 A1 | 12/2013 |
| WO | 2014/108465 A1 | 7/2014 |
| WO | 2014/111192 A1 | 7/2014 |
| WO | 2015/011049 A1 | 1/2015 |

OTHER PUBLICATIONS

Written Opinion dated Nov. 7, 2013, for PCT/IB2013/054481.
Belgian Search Report dated Feb. 18, 2013, for BE 2012/0370.
Belgian Search Report dated Feb. 20, 2013, for BE 2012/0474.

* cited by examiner

PANEL FOR FORMING A FLOOR COVERING

BACKGROUND OF THE INVENTION

1. Field of the Invention

This invention relates to panels for forming a floor covering and to a method for manufacturing such panels.

More particularly, the invention relates to panels comprising at least a layer, more particularly a substrate layer, of thermoplastic material. Further, such panels may also comprise, above said layer, at least a top layer with a printed decor and a translucent or transparent wear layer.

In particular, the present invention relates to panels of the type which, on two or more opposite edges, comprises coupling means or coupling parts with which two of such floor panels can be coupled at said edges in such a manner that they are mutually locked in a horizontal direction perpendicular to the respective edge and in the plane of the floor panels, as well as in a vertical direction perpendicular to the plane of the floor panels. Such floor panels can be applied for composing a so-called floating floor covering, wherein the floor panels are connected to each other at their edges, however, lie freely on the underlying surface.

2. Related Art

Such panels are known, for example, from EP 1 938 963, EP 2 339 092 A1 and WO 2010/023042. From these documents, more particularly vinyl-based floor panels are known for forming a floating floor covering. Such vinyl-based floor panels mostly have a thickness of 3 to 5 millimeters and have a high material density. The respective core of the panels is composed of one or more prefabricated layers of thermoplastic material, for example, soft PVC. Above the print, a transparent thermoplastic layer and possibly a superficial layer of lacquer are provided. The various layers are adhered to each other by means of a thermal lamination process. According to EP 2 339 092 A1, a reinforcing layer on the basis of glass fiber can be applied.

The panels of the state of the art show the disadvantage that they are strongly subjected to shrinkage and expansion, or even bending, under the influence of temperature. Shrinkage and expansion may lead to that the floor covering or the individual panels are pushed upward, and, for example, to a mutual release of the coupling parts, or to the phenomenon that the individual panel-shaped elements will drift apart, whereby gaps may occur. The features of the panels of the state of the art are such that problems may occur already with warming due to incident sunlight, for example, at a window in a room.

From WO 2012/004701, it is known to apply a glass fiber layer or embedded profiles for increasing the dimensional stability of such panels. In particular, here the bending stiffness of the panels has been tackled.

U.S. Pat. No. 6,306,318 describes a method for recycling discarded carpets, wherein, starting from a molten mixture of a recyclate on the basis of discarded carpets and fresh soft PVC, flexible floor tiles having a minimum thickness of 5 millimeters are produced by means of an injection molding process. As an alternative for the recyclate of discarded carpets, also recyclate of glass fiber-reinforced synthetic material (English: fiberglass) can be applied. The obtained tile is relatively hard and the flexibility leaves much to be desired. This may lead to problems with the impact sound during use and an incapability of adapting to unevenness of the underlying surface. The injection-molded tile comprises coupling means along the edges, however, these do not provide for a locking in vertical direction. Moreover, the precision of injection molding, in particular in the case of soft thermoplastic materials, is inferior. This method is time-consuming, and moreover there is little possibility of variation in the appearance of the wear side of the tiles. Such tiles possibly still show a strong dimensional change with changing temperature.

GB 1 248 060 describes, as an alternative of a method similar to that of U.S. Pat. No. 6,306,318, the possibility of manufacturing reinforced thermoplastic materials by means of a method wherein continuous fiber layers are stacked and pressed in a mold alternating with thermoplastic granulate layers. According to the examples, hard PVC can be applied as thermoplastic material. Above all, this document aims at an increased bending stiffness of the obtained thermoplastic material. This method, too, is time-consuming and offers little possibility of variance in the appearance of the obtained materials.

SUMMARY OF THE INVENTION

The present invention relates to an alternative panel, which, in the first place, is intended as a floor panel for forming a floating floor covering. According to various preferred embodiments of the invention, also a solution is offered for one or more problems with the panels of the state of the art.

To this aim, the invention, according to its first independent aspect, relates to a panel for forming a floor covering, wherein this panel comprises at least two layers consisting of thermoplastic material, with the characteristic that the aforementioned two layers substantially consist of a strewn and pressed granulate, wherein the respective layers enclose a glass fiber layer, preferably a glass fiber fleece. As layers of strewn apart and pressed granulate of the respective thermoplastic material are used, wherein these layers enclose a glass fiber layer, a better stability of the panels is obtained. In this manner, the glass fiber layer is better embedded in the panel and in this manner can counteract dimensional changes more effectively.

Preferably, the glass fiber layer relates to a glass fiber cloth or glass fiber fleece. Preferably, this relates to a so-called "non-woven", namely a glass fiber fleece. The inventors have found that with a glass fiber fleece, better embedding in the thermoplastic material and thereby a more effective working thereof can be achieved.

Preferably, said glass fiber layer is covered with an adherence layer, for example, in that the glass fiber layer has been impregnated in said thermoplastic material of the granulate, or in that it is provided with a coating layer of this thermoplastic material.

Preferably, at least one of said two layers, and still better both layers, comprise individual fibers, for example, of a length greater than 1 mm. By "individual fibers", it is meant that they as such do not form part of a layer or a prefabricated layer, such as a glass fiber cloth, but, for example, are distributed freely within the thermoplastic material, whether or not uniformly. The inventors have found that the use of such loose or individual fibers further can contribute to the dimensional stability of the panels, and then in particular can restrict the extent of expansion or shrinkage. Such individual fibers can be active over a greater thickness of the thermoplastic material than the aforementioned glass fiber fleece (non-woven) or glass fiber cloth (woven). Such individual fibers further preferably also show one or more of the following features, namely that:
- they have an average length of 3 millimeters or more. Good results have been obtained with fibers having an average length of approximately 4.5 millimeters. Preferably, the average length is shorter than 10 millimeters or even shorter than 6 millimeters;
- they are present in the layer in a concentration situated between 1 and 25 percent by weight, and still better between 5 and 15 percent by weight, without including possible other fillers, such as chalk;
- this relates to individual glass fibers. Preferably, E-Glass is chosen, for example, as defined in DIN 1259. According to an alternative, steel fibers or other fibers, such as carbon fibers, aramid fibers or polyethylene fibers can be applied;
- this relates to moisture-resistant fibers and, thus, no cellulose fibers, unless they are coated or treated, for example, by means of acetylation, in order to render them, at least to a certain extent, moisture-resistant;
- the fibers, for example, glass fibers, on average have a diameter situated between 1 and 100 micrometers or still better between 3 and 30 micrometers, wherein in various experiments the range between 5 and 25 micrometers has proven to be the best;
- the fibers are provided with a coating or a treatment which improves the adherence to the thermoplastic material. Preferably, the surface of the fibers is treated with a coupling agent, such as with silane;
- the fibers have a thermal expansion coefficient which is smaller than that of the thermoplastic material in which they are situated, and/or a Young's modulus which is higher than that of the thermoplastic material in which they are situated;
- the fibers have a Young's modulus of more than 40, still better of more than 60 GPa;
- the fibers have a thermal expansion coefficient of less than 30 μm/mK and still better of less than 5 μm/mK.

Preferably, said thermoplastic material relates to polyvinyl chloride, preferably semi-rigid or even soft polyvinyl chloride (PVC), namely PVC with plasticizers, for example, with a percentage of plasticizers in the PVC of more than 12, more than 20 or even more than 30 percent by weight. It is clear that instead of using PVC, it is also possible to apply polypropylene (PP), polyethylene (PET) or polyurethane (PUR).

Preferably, the panel of the invention also comprises, above said two layers, at least a printed decor and a translucent or transparent wear layer provided there above.

Said decor can consist of a print performed on a synthetic material film, for example, a printed PVC film, PU film, PP film, PET film. In the case of a PP film, this may relate, for example, to an oriented polypropylene film. In the case of a PVC film, this preferably relates to a hard PVC film, namely, to a film on the basis of PVC without plasticizer or with an amount of plasticizer of less than 5 percent by weight. Such hard PVC film can be printed with higher precision, certainly in the case of a print performed with water-based inks. In such case, in a drying operation by means of supplied heat in the drying process is desirable, however, the possible expansion of the film is restricted as a result of choosing hard PVC. The wear layer preferably also comprises a thermoplastic material, such as soft or hard PVC, PU, PP or PET. Preferably, the transparent thermoplastic wear layer is free from solid additives, such as ceramic particles for enhancing wear resistance, although this kind of particles, as such is not excluded. However, the inventor has found that they can be omitted with the aim of obtaining good transparency while still maintaining an acceptable wear resistance, namely a wear resistance comparable to or better than that of a laminate panel of the AC2 or AC3 class, as measured according to EN 13329. The wear layer preferably has a thickness of minimum 0.15 millimeters and still better minimum 0.3 millimeters, however, preferably less than 1 millimeter, wherein 0.2 to 0.4 millimeters is a good value. With this good value, by means of the thermoplastic material of the wear layer alone, thus, without taking into account possible solid additives, already a sufficient wear resistance can be obtained for residential applications. So, for example, it is possible to achieve an IP value (initial wear point) of 2000 or more in the Taber tests, as described in EN 13329, annex E.

According to an alternative, it is not excluded that the printed decor or the print might be provided on the underside of the wear layer.

Preferably, the aforementioned two layers which according to the invention enclose the glass fiber layer relate to a substrate layer, namely a layer which extends underneath a top layer. Preferably, at least one of these layers is situated at least halfway in the thickness of the panel. In this manner, the risk of a possible bending effect with changing temperature is restricted even further or is excluded.

Preferably, the thickness of the panel substantially, thus, for more than one half of it or more, is formed by the aforementioned two layers which enclose the glass fiber layer. Preferably, the thickness of the panel essentially, namely, for more than 80 percent thereof, is formed by these two layers.

Preferably, the substrate has a thickness of 1.3 to 10 millimeters. The entire floor panel preferably has a thickness situated between 2 and 6 millimeters. Preferably, the substrate forms at least one half of the thickness of the floor panel.

On the underside of the substrate, a counter layer or underlay, such as a vapor-tight layer, can be provided. Such counter layer or underlay preferably consists of a thermoplastic synthetic material layer. The counter layer preferably has a thickness which corresponds to the thickness of the top layer, including a possible backing layer, however, preferably is made thinner. The counter layer preferably functions as a balancing layer, such that a balanced sandwich structure can be obtained, namely without or only with minimal warping of the panels.

According to the most preferred embodiment of the invention, the panel is free from such aforementioned counter layer or underlay. In such case, the lowermost of said two layers, which, according to the invention, enclose the glass fiber layer, preferably also forms the underside of the panel.

Preferably, said thermoplastic material of at least one of said two layers which, according to the invention, enclose the glass fiber layer, further also comprises fillers, such as chalk or limestone.

A lacquer layer can be applied as the uppermost layer of the panel. Herein, this may relate to a UV— or electron beam-hardening lacquer layer and/or to a PU lacquer layer.

Preferably, the invention is applied with floor panels which, at the respective edges, are provided with mechanical coupling means allowing to couple two of such floor panels to each other in such a manner that a locking is created in a vertical direction perpendicular to the plane of the coupled panels, as well as in a horizontal direction perpendicular to the coupled edge and in the plane of the panels. Preferably, the coupling means also show one or a combination of two or more of the following features:

the feature that the mechanical coupling means or coupling parts are substantially realized as a tongue and a groove bordered by an upper lip and a lower lip, wherein this tongue and groove substantially are responsible for the locking in said vertical direction, and wherein the tongue and the groove are provided with additional locking parts, substantially responsible for the locking in said horizontal direction. Preferably, the locking parts comprise a protrusion on the lower side of the tongue and a recess in the lowermost groove lip. Such coupling means and locking parts are known, for example, from WO 97/47834;

the feature that the mechanical coupling means or coupling parts press the coupled floor panels against each other, for example, in that these mechanical coupling means are provided with a so-called pre-tension, as known as such from EP 1 026 341. The tensioning force with which the floor panels are pressed against each other or towards each other, can be obtained, for example, in combination with the above feature by means of a lower lip, which is bent out in coupled position and which, when trying to spring back, presses against the lower side of the tongue;

the feature that the mechanical coupling means allow a coupling by means of a horizontal, or quasi-horizontal shifting movement of the panels towards each other;

the feature that the mechanical coupling means allow a coupling by means of a turning movement W along the respective edges;

the feature that the mechanical coupling means allow a coupling by means of a downward-directed movement of a male coupling part having, for example, a tongue, up into a female coupling part having, for example, a groove. With this type of panels, there is a high risk that the connection will get released with an expansion or pressing upward of the panels, as in such case the locking in vertical direction can be weak;

the feature that the mechanical coupling means, or at least the pertaining upper edge, are realized by means of a milling operation with rotating milling tools.

Preferably, said coupling means substantially are realized in said substrate, more particularly at least in at least one of the aforementioned two layers which, according to the invention, enclose the glass fiber layer. Preferably, said coupling means are provided by means of a milling operation with rotating milling tools. Preferably, the floor panel of the invention relates to a rectangular, either oblong or square, panel, which is provided with mechanical coupling means on both pairs of opposite edges.

Panels which are provided with coupling means preferably have a thickness of at least 2.5, still better at least 3 millimeters. In these panels, the invention shows its advantages to the full, as the increased stability which can be offered by the provisions of the invention can result in a qualitatively better coupling of the panels, wherein this quality can also be maintained longer.

It is not excluded that the invention is applied for panels which are free from coupling means at their edges, wherein these panels then are intended for being glued to the underlying surface with their lower side. Such panels preferably have a thickness of less than 4 millimeters, however, preferably of more than 1.5 millimeters.

The panels of the invention preferably have a width of 8 centimeters or more. Particularly preferred dimensions are a width situated between 14 and 22 centimeters and a length situated between 118 and 220 centimeters. It is clear that here, this relates to panel-shaped elements and thus not to wall-to-wall floor covering. However, the panel-shaped elements do not necessarily have to be rigid, but can be rollable. In particular, the invention relates to so-called LVT (luxury vinyl tile) in plank format or in tile format.

According to an independent second aspect, the invention also relates to a method which can be applied for manufacturing panels with the characteristics of the first aspect or the preferred embodiments thereof, however, which can also be applied more widely. To this aim, the invention relates to a method for manufacturing panels, wherein said method comprises at least the step of forming a first layer and a second layer of thermoplastic material, with the characteristic that for forming said first layer, a granulate of said thermoplastic material is deposited on an underlying surface, a glass fiber layer, preferably a glass fiber fleece, is provided on this deposited layer of granulate, and thereafter, for forming said second layer, also a granulate of said thermoplastic material is deposited on said glass fiber layer, wherein in a subsequent step both layers, namely, said first as well as said second layer, including the glass fiber layer, are consolidated. When providing the glass fiber layer and the granulate of the second layer, the granulate of the first layer thus is not yet consolidated, or, in other words, at that moment the first layer still consists of loose, strewn granulate. As the two layers, including the glass fiber layer, are consolidated together, a better inclusion of the glass fiber layer is obtained. Said consolidation preferably is performed in a heated press device, such as between the belts of a continuous press device.

According to the second aspect, the two layers concerned are formed on the basis of a granulate of said thermoplastic material. For example, the granulate initially can be strewn or deposited on an underlying surface in another manner, after which this granulate is consolidated to a thermoplastic layer by means of a, preferably heated, press treatment. According to the most preferred embodiment, the granulate of the first layer is deposited, or possibly strewn, on a transport device, after which the glass fiber layer, preferably coming from a roll, is placed on the strewn layer, and after which the granulate of the second layer is deposited. Then, the two strewn layers enclosing the glass fiber layer are guided between the belts of a continuous pressing device, where consolidating is performed or at least is initiated. Preferably, the strewing and pressing thus is performed in a continuous manner and in line with each other. According to the present particular preferred embodiment, to this aim a device can be applied, such as the one known from WO 2012/016916, however, with at least two strewing units, namely, at least one for each of said two layers.

It is clear that preferably soft PVC, namely PVC having an amount of plasticizer of 12 percent by weight or more, is applied as a thermoplastic material and that preferably at least one, however, still better both of said two layers further also comprise fillers, such as chalk or lime. These fillers either can be supplied via the granulate concerned or not. Preferably, the granules of said granulate, in the first as well as in the second layer, for at least 50 percent by weight or for 60 to 80 percent by weight consist of fillers, such as chalk or lime. By applying highly filled granulate, a better distribution of the fillers in the layer to be realized, as well as a smooth production process are obtained.

Preferably, the granulate, of the first as well as of the second layer, has an average particle size of 1 to 3 millimeters or of approximately 2 millimeters or less. According to a particular embodiment, at least in one of said two layers a so-called micro granulate is applied, or granulate having an average particle size of less than 1 millimeter, such as, for example, a granulate having an average particle size of approximately 800 micrometers. By making use of micro granulate, a more uniform composition of the respective thermoplastic layer is obtained. Hereby, the glass fiber layer will be better enclosed by said two layers.

Preferably, said granulates also comprise individual fibers, preferably glass fibers.

It is evident that the obtained consolidated whole of said two layers and the enclosed glass fiber layer must be processed together with other material, whether or not in layers, for forming the final panel.

According to the invention, it is possible that in the first place plates or sheets are obtained, from which a plurality of such panels is obtained by subdividing them.

Processing the consolidated assembly of the two layers with enclosed glass fiber layer generally can be performed in various manners. According to a first possibility, by means of heat and pressure the respective layer, at least at the surface, is melted together with one or more further thermoplastic layers, such as a printed decor film and/or a wear layer and/or a further substrate layer. According to a second possibility, the material of one or more further layers, in particular one or more further substrate layers, is provided in liquid form or in paste form by calendering it or providing it on the already formed layer in another manner.

Preferably, the method of the invention also comprises the steps of providing a printed decor and a translucent or transparent wear layer on said two layers, whereby these steps are performed after having consolidated said two layers, including the glass fiber layer. At least in the step of providing said wear layer, it can be started from a thermoplastic film, which is connected to the consolidated assembly of said two layers enclosing the glass fiber layer by means of a thermal laminating process. Preferably, to this aim also a continuous press device is applied, and preferably these steps are performed in line with the steps of forming the first and/or the second layer.

It is noted that the transparent or translucent wear layer, when applied, preferably is free from fibers, whether or not in the form of layers. When use is made of a decor film, this latter, too, preferably is free from fibers, whether or not in the form of layers. For the decor film, preferably a printed hard PVC film is applied, namely, a PVC film which is free or almost free from plasticizers. As aforementioned, the use of a hard PVC film leads to a print of a higher quality, as it is less subject to dimensional changes during printing. This is particularly advantageous when during printing one or more drying treatments by means of heat supply are performed, as may be the case when printing with water-based pigmented inks. For the transparent wear layer, use can be made of a soft PVC layer, for example, with an amount of plasticizers of 12 percent by weight or more.

Prior to said steps of providing a printed decor and the translucent or transparent layer, preferably a levelling treatment is performed on the surface of said two layers. The levelling treatment may consist of a grinding treatment and/or of providing one or more layers of plastisol. Preferably, this levelling treatment is performed in line with the steps of forming the first and/or the second layer.

It is evident that the thermoplastic material further can have the compositions stated in the context of the first aspect. Preferably, the thermoplastic material relates to a feedstock for forming semi-rigid or soft PVC. Preferably, this PVC comprises an amount of plasticizer of more than 12 percent by weight, for example, of 20 percent by weight or more.

Further, it is clear that the granulate which is applied for said first layer does not necessarily have to be identical to the granulate which is applied for said second layer. By applying granulates of mutually differing composition and/or average particle size, particular features can be attained.

The above finding of course is advantageous, independent of the fact whether or not an enclosed glass fiber layer is applied. Therefore, the invention, according to an independent third aspect, also relates to a method for manufacturing panels, wherein this method comprises at least the step of forming a first layer and a second layer of thermoplastic material, with the characteristic that for forming said first layer, a first granulate of said thermoplastic material is strewn and thereafter, for forming the second layer, a second granulate of said thermoplastic material is strewn on top of said first layer, wherein in a subsequent step both layers are consolidated and wherein the composition and/or the average particle size of the first granulate is different in comparison with the second granulate.

The invention of the third aspect can be performed in various possible manners. Below, without desiring to be exhaustive, some possibilities are summed up.

According to a first possibility, the granulates comprise a different amount of plasticizer, wherein one of the granulates comprises 12 percent by weight or more of plasticizer and the other of the granulates comprises less than 5 percent by weight or no plasticizer. According to this first possibility, the granulate preferably relates to a granulate on the basis of PVC (polyvinyl chloride), wherein one of the granulates thus comprises soft PVC, whereas the other granulate comprises hard or semi-rigid PVC.

According to a first practical embodiment of this first possibility, the layer formed by the soft PVC is situated closer to the underside of the panel than the layer formed by the hard or semi-rigid PVC. By means of this first practical embodiment, a floor panel can be obtained which can adapt to possible unevennesses on the underlying surface by means of the soft PVC, whereas the risk that this unevenness migrates to, or shows on, the surface of the panel is strongly reduced by means of the intermediate layer of hard or semi-rigid PVC. The layer of hard or semi-rigid PVC can be made thinner than the layer of soft PVC. Above the layer of hard or semi-rigid PVC, a further strewn layer of granulate on the basis of soft PVC can be situated, such that the layer of hard PVC is located approximately in the middle of the substrate.

According to a second practical embodiment of this first possibility, the layer formed by the hard or semi-rigid PVC is situated closer to the underside of the panel than the layer formed by the soft PVC. By such construction, the bending stiffness of the final panel can be increased. Preferably, a second layer of the hard PVC granulate is situated on the other side of the layer formed by the soft PVC, such that a stable sandwich structure is created. Preferably, the substrate of the panel substantially consists of three layers, namely a lowermost layer on the basis of hard PVC, a central layer on the basis of soft PVC, and an uppermost layer on the basis of hard PVC. Of course, the substrate can comprise an underlay on the underside, and on the upper side a top layer with a printed decor and a translucent or transparent wear layer. The layer or layers of hard or semi-rigid PVC can be made thinner than the central layer of soft PVC.

According to a second possibility, the granulates have a different average particle size, wherein one of the granulates has an average particle size of 1.5 to 2.5 millimeters and the other of the granulates has an average particle size of less than 1 millimeter. The granulate having an average particle size of less than 1 millimeter preferably is applied for forming an outermost layer of the substrate, for example, for a layer on which the printed decor is provided, whereas for the larger granulate can be applied for forming a central layer situated there underneath. Hereby, a uniform surface is obtained on which the decor can be provided in a simple manner and without visible defects.

According to a third possibility, the granulates have a different composition in that one of the granulates is obtained from fresh polyvinyl chloride and the other is obtained from a recyclate of polyvinyl chloride. Preferably, the granulate of fresh polyvinyl chloride is situated at the exterior of the substrate, whereas the granulate on the basis of the recyclate is applied for an internal or central layer situated there beneath. According to this possibility, it is also possible to obtain a uniform surface on which the decor can be provided in a simple manner and without visible defects.

According to a fourth possibility, the granulates have a different composition in that one of the granulates comprises 60 to 80 percent by weight of filler, such as chalk, and the other comprises less than 50 percent by weight of filler, or no filler. The highly filled layer can be applied, for example, towards the underside of the panel in order to obtain an increased sound insulation, whereas the less filled or not filled layer is situated there above. This latter layer realizes a surface layer with an acceptable uniformity on which the decor can be provided in a simple manner and without visible defects.

It is evident that the invention also relates to panels which are obtained by means of a method with the characteristics of the third aspect.

It is clear that, according to the invention, by "substrate" an inner layer of the floor panel itself is meant, which as such can be made one- or multi-layered, however, wherein the respective layer or layers preferably have a common thickness which is larger than one half of the thickness of the entire panel concerned and/or wherein the respective layer or layers have a common weight which preferably is higher than one half of the weight of the entire panel concerned. Preferably, the contour of the possible coupling means is substantially or entirely realized in the substrate.

Further, it is clear that by "fibers", elongate particles are meant. Preferably, the length of such fiber is at least hundred times the average diameter thereof. Preferably, this relates to fibers with a circular or approximately circular cross-section.

BRIEF DESCRIPTION OF THE DRAWINGS

With the intention of better showing the characteristics of the invention, hereafter, as an example without any limitative character, some preferred embodiments are described, with reference to the accompanying drawings, wherein.

DETAILED DESCRIPTION OF THE INVENTION

Figure 1:
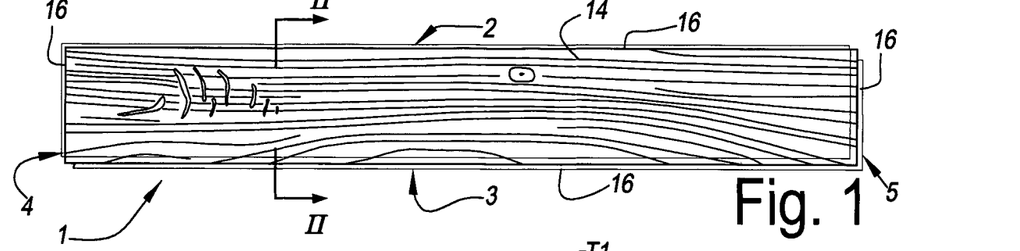
FIG. 1 represents a panel with the characteristics of the invention.

FIG. 1 represents a rectangular and oblong floor panel 1 with a pair of long sides 2-3 and a pair of short sides 4-5.

Figure 2:
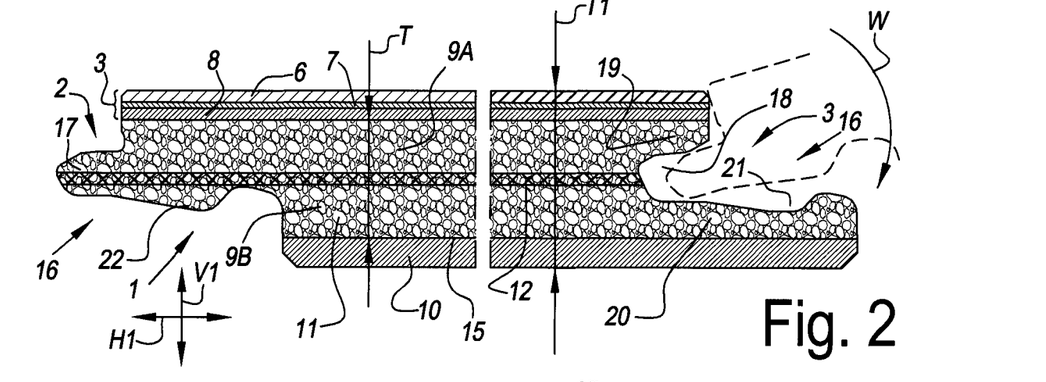
FIG. 2, at a larger scale, represents a cross-section according to lines II-II in FIG. 1.

FIG. 2 represents that the respective floor panel 1 is composed of various layers 6-7-8-9A-9B-10.

The substrate 11 is formed by the layers 9A and 9B of thermoplastic material, in this case soft PVC, which substantially consist of strewn and pressed granulate. Further, the substrate layer 9 concerned comprises an enclosed glass fiber fleece 12. Above the respective layers 9A-9B, a top layer 13 is provided, which as such comprises a printed decor film 7 and a transparent wear layer 6 on the basis of thermoplastic material. The top layer 13 further also comprises a backing layer 8 located underneath the decor film 7. In the example, the backing layer 8, the decor film 7 and the wear layer 6 are made on the basis of polyvinyl chloride.

In the example, the decor film 7 is provided with a print with a wood pattern 14, wherein, per panel 1, each time the image of a single wooden board is provided.

On the lower side 15 of the substrate 11, a counter layer 10 is provided, which is also based on soft PVC. According to the invention, it is also possible that one of said two layers 9A-9B, namely the lowermost layer 9B, forms the lower side of the panel.

FIG. 2 represents that at least one of the layers 9A-9B is present at least in the middle of the thickness T of the substrate 11. In this case, the respective layers 9A-9B and the enclosed glass fiber layer 12 form the entire substrate 11.

FIG. 2 further also represents that the respective layers 9A-9B constitute at least 40 percent and here even more than one half of the thickness T of the panel 1.

Further, the panel 1 of the example is provided with mechanical coupling means or coupling parts 16 on both opposite edges 2-3. FIG. 2 shows that at least the mechanical coupling means 16 on the long pair of edges 2-3 allow that two of such floor panels 1 can be coupled to each other in such a manner that a locking is created in a vertical direction V1 perpendicular to the plane of the coupled panels 1, as well as in a horizontal direction H1 perpendicular to the coupled edges 2-3 and in the plane of the panels 1. The illustrated coupling means 16 show the characteristic that they are substantially realized as a tongue 17 and a groove 18 bordered by an upper lip 19 and a lower lip 20, wherein said tongue 17 and groove 18 substantially are responsible for the locking in said vertical direction V1, and wherein the tongue 17 and the groove 18 are provided with additional locking parts 21-22 substantially responsible for the locking in said horizontal direction H1. In this case, the locking parts comprise a protrusion 21 on the lower side of the tongue 17 and a cooperating-therewith recess 22 in the lower lip 20.

The coupling means 16 represented here allow at least a coupling by means of a turning movement W along the respective edges 2-3.

The mechanical coupling means 16 are substantially realized in the layers 9A-9B, which, according to the invention, enclose the glass fiber layer. In the example, they are provided by means of a milling treatment, for example, by means of rotating tools.

Figure 3:
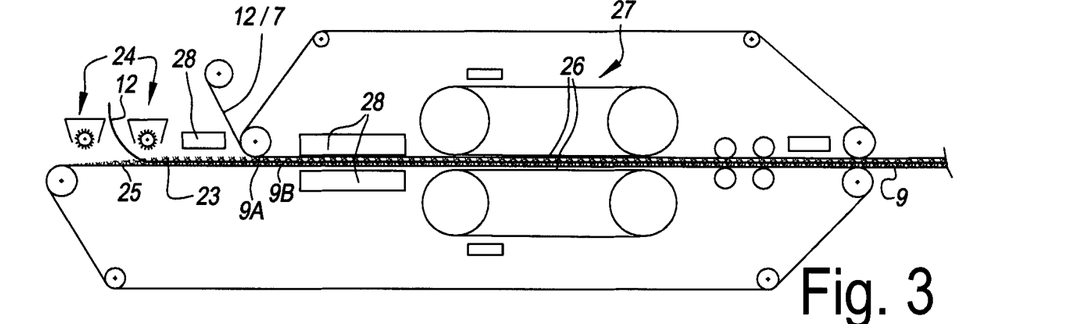
FIG. 3 schematically represents some steps in a method with the characteristics of the second aspect.

FIG. 3 represents some steps of a method for manufacturing the panel of FIGS. 1 and 2. More particularly, the step is represented of forming the layers 9A-9B with thermoplastic material, which, according to the invention, enclose the glass fiber layer 12.

In the example of FIG. 3, the respective layers 9A-9B are formed on the basis of a granulate 23 of the respective thermoplastic material.

FIG. 3 represents that the granulate 23 of the first layer 9B as well as of the second layer 9A initially is deposited on a transport device 25, on the glass fiber layer 12, respectively, by means of a strewing device 24, after which it is consolidated between the belts 26 of a continuous pressing device 17. Herein, the granulate 23 is transported along one or more heating devices 28 and possibly it can be cooled again after the press treatment or at the end of the press treatment. By cooling, it is achieved that the pressed plates, sheets or layers relatively fast are manageable for further processing.

FIG. 3 further also represents that simultaneously with pressing, a further layer, in this case at least the decor film 7, can be applied or inserted by providing it on the granulate 23 in the press treatment. Instead of to a decor film, this may also relate, for example, to an additional glass fiber layer 12 or to a backing layer 8, or a wear layer 6. It may also relate to a composition of layers already laminated together, such as an already entirely or partially composed top layer 3, which, for example, comprises at least a decor film 7 and a wear layer 6, or at least a backing layer 8 and a decor film 7; or the backing layer 8, decor film 7 as well as the wear layer 6. A possible superficial lacquer layer preferably is provided after the press treatment. This is not represented here.

Although FIG. 3 represents only two strewing devices 24, of course also further strewing devices, for example, a third and a fourth strewing device, can be provided. Further, it is clear that these strewing devices 24 can deposit granulates 23 of a mutually differing composition and/or average particle size. In such case, an embodiment of the third aspect mentioned in the introduction is obtained.

Figure 4:
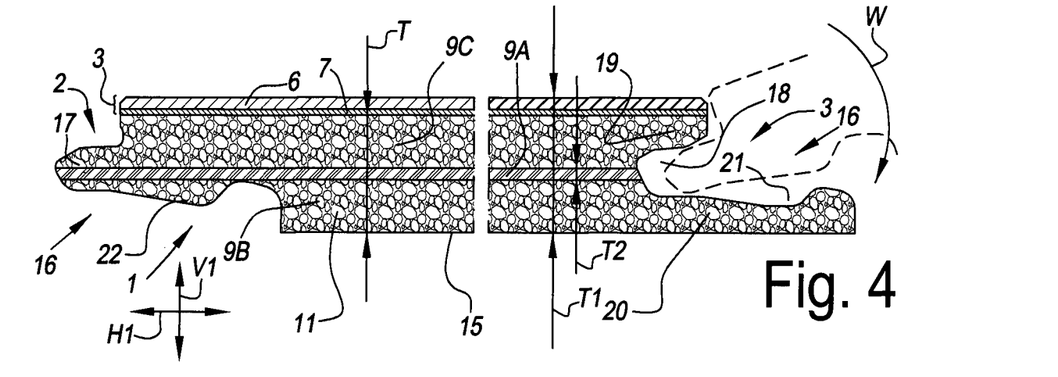
FIG. 4, in a view similar to that of FIG. 2, represents another variant, obtained by means of a method with the characteristics of the third aspect.

FIG. 4 represents another example of a panel which is obtained by means of a method with the characteristics of the third aspect, wherein the substrate 11 is obtained on the basis of at least two granulates 23 having a mutually differing composition and/or average particle size. In the example, the layers 9B and 9C are formed on the basis of a granulate comprising PVC with at least 12 percent by weight of plasticizer, whereas the layer 9A, situated centrally in the substrate, is formed on the basis of a granulate comprising PVC with less than 5 percent by weight of plasticizer or without plasticizer. FIG. 4 thus forms an example of the first practical embodiment, mentioned in the introduction, of the first possibility within the third aspect. FIG. 4 also shows that the layer 9A can be made thinner than the layers 9A and 9C. In this case, the layer 9A on the basis of the hard or semi-rigid PVC has a thickness T2 which is less than 20 percent of the overall thickness T1 of the substrate 11. This embodiment may lead to a significant reduction of the emerging or showing of any unevenness in the underlying surface towards the decorative side of the floor panel 1.

The present invention is in no way limited to the herein above-described embodiments; on the contrary, such panels, methods and granulates can be realized according to various variants, without leaving the scope of the present invention. Moreover, the panels, instead of as floor panels, can also be realized as wall panels or ceiling panels or even as furniture panels.

The invention claimed is:

1. A panel comprising at least a substrate of thermoplastic material and a top layer with a printed decor and a translucent or transparent wear layer,
   wherein said substrate substantially consists of three layers, including a lowermost layer, a central layer and an uppermost layer, all made from thermoplastic material,
   wherein the thermoplastic material of the central layer has a lower plasticizer content than the thermoplastic material of the lower most layer and the uppermost layer.

2. The panel according to claim 1, wherein said thermoplastic material is chosen from the group consisting of polyvinylchloride, polypropylene, polyethylene and polyurethane.

3. The panel according to claim 2, wherein said lowermost layer is on the basis of soft polyvinylchloride, said central layer is on the basis of hard or semi-rigid polyvinylchloride, and said uppermost layer is on the basis of soft polyvinylchloride.

4. The panel according to claim 3, wherein said central layer comprises less than 5 percent by weight of plasticizer or no plasticizer.

5. The panel according to claim 4, wherein said lowermost and said uppermost layer comprise 12 percent by weight or more of plasticizer.

6. The panel according to claim 1, wherein said panel is a floor panel for a floating floor covering and at two or more opposite edges comprises coupling parts with which two of such floor panels can be coupled at said edges in such a manner that they are mutually locked in a horizontal direction perpendicular to the respective edge and in the plane of the floor panels, as well as in a vertical direction perpendicular to the plane of the floor panels.

7. The panel according to claim 1, wherein said substrate has a thickness of 1.3 to 10 millimeters.

8. The panel according to claim 1, wherein said panel has a thickness situated between 2 and 6 millimeters.

9. The panel according to claim 1, wherein said decor consists of a print performed on a synthetic material film, wherein said film is a printed polyvinylchloride film, a polyurethane film, a polypropylene film or a polyethylene film.

10. The panel according to claim 1, wherein said wear layer also comprises a thermoplastic material, wherein said thermoplastic material is hard or soft polyvinylchloride, polyurethane, polypropylene or polyethylene.

11. The panel according to claim 1, wherein the thickness of the panel is for more than one half formed by said substrate.

12. The panel according to claim 1, wherein said top layer comprises a backing layer located underneath the printed decor.

13. A panel comprising at least a substrate of thermoplastic material having a thickness of 1.3 to 10 millimeter, and a top layer with a printed decor and a translucent or transparent wear layer,
   wherein said thermoplastic material is chosen from the list consisting of polyvinylchloride, polypropylene, polyethylene and polyurethane and the thickness of the panel is for more than one half formed by said substrate, said panel being a floor panel for a floating floor covering and comprising at two or more opposite edges coupling parts with which two of such floor panels are able to be coupled at said edges in such a manner that they are mutually locked in a horizontal direction perpendicular to the respective edge and in the plane of the floor panels, as well as in a vertical direction perpendicular to the plane of the floor panels, wherein said substrate substantially consists of three layers, including a lowermost layer, a central layer and an uppermost layer, all made from thermoplastic material, wherein the thermoplastic material of the central layer comprises a plasticizer content of less than 5% by weight of plasticizer or no plasticizer and the thermoplastic material of the lower most layer and the uppermost layer comprise 12 percent by weight or more of plasticizer.

14. The panel according to claim 13, wherein said decor consists of a print performed on a synthetic material film, wherein said film is a printed polyvinylchloride film, a polyurethane film, a polypropylene film or a polyethylene film.

15. The panel according to claim 14, wherein said wear layer also comprises a thermoplastic material, wherein said thermoplastic material is hard or soft polyvinylchloride, polyurethane, polypropylene or polyethylene.

16. The panel according to claim 13, wherein said panel has a thickness situated between 2 and 6 millimeters.

\* \* \* \* \*